Sept. 22, 1953   W. F. CRALLE   2,652,766
PORTABLE DOUBLE BACON GRILL
Filed July 18, 1951
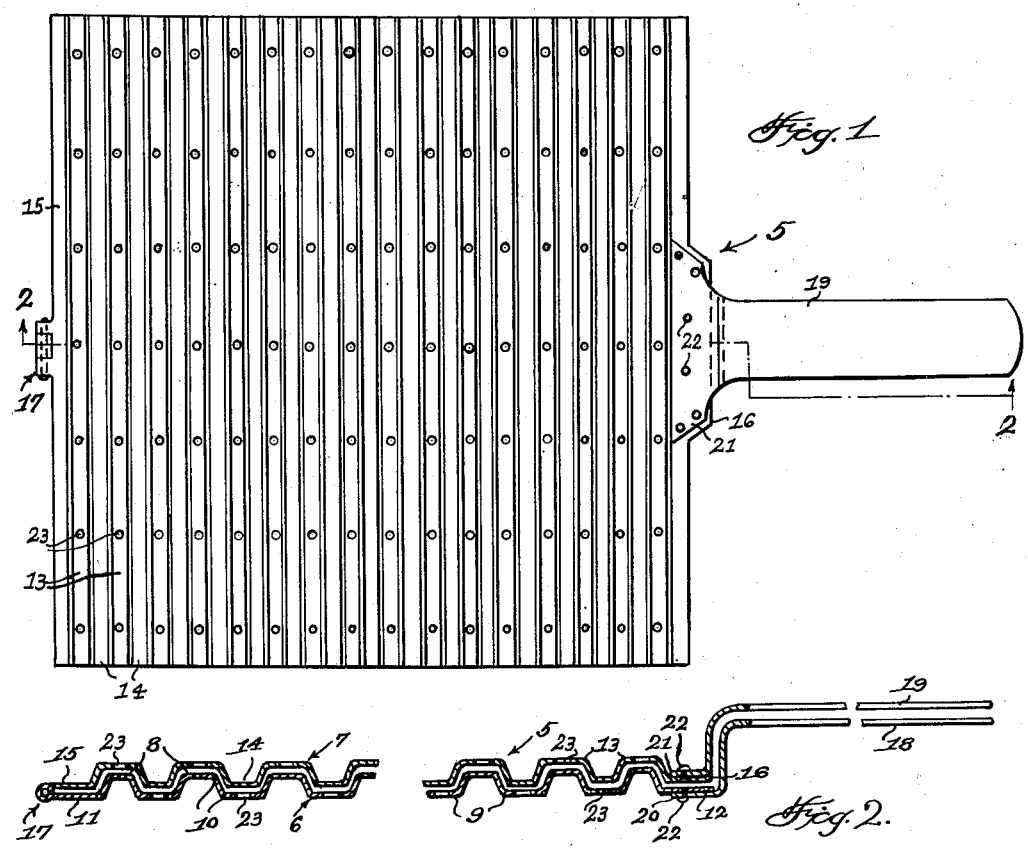
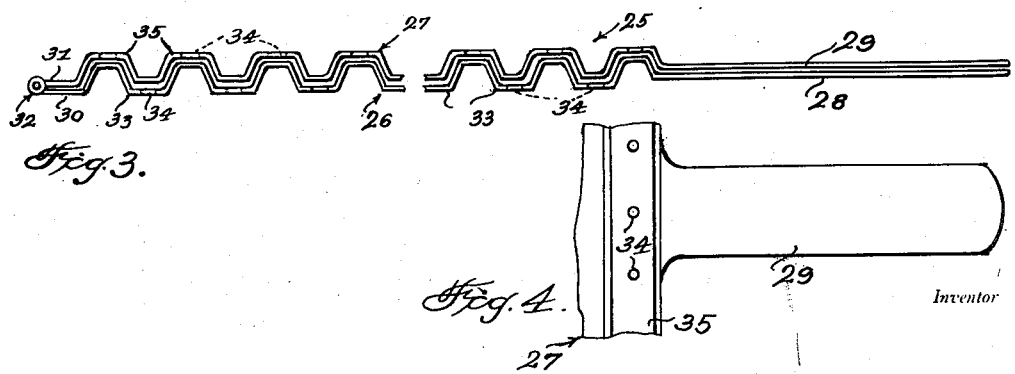
Inventor
WILLIAM F. CRALLE
By John N. Randolph
Attorney Patented Sept. 22, 1953

2,652,766

UNITED STATES PATENT OFFICE 2,652,766

PORTABLE DOUBLE BACON GRILL

William F. Cralle, Charlotte, N. C.

Application July 18, 1951, Serial No. 237,336

2 Claims. (Cl. 99—349)

This invention relates to a novel grill primarily adapted for cooking bacon but which may be utilized for cooking other food items and has for its primary object to hold a plurality of slices of bacon in straight extended positions during the cooking thereof to thereby materially reduce the shrinkage of the bacon.

Another object of the invention is to provide a double grill in which a plurality of slices of bacon will each be gripped at a plurality of points to minimize shrinkage and to support the bacon in an undulating or wavy form in which it will be delivered from the grill when cooked so as to be attractive in appearance.

Another object of the invention is to provide a bacon grill having means for supporting the bacon in an elevated position relatively to a frying pan, skillet, hot plate or cooking grill so that grease may run off from the bacon during the cooking operation leaving the bacon in a crisp condition when removed from the grill.

Still a further object of the invention is to provide a cooking grill wherein the metal surfaces disposed on opposite sides of the bacon are sufficiently uniform to impart a uniform heat to all portions of the bacon to accomplish a uniform cooking thereof.

Various other objects and advantages of the invention will hereinafter become more fully apparent from the following description of the drawing, illustrating presently preferred embodiments thereof, and wherein:

Figure 1 is a plan view of one embodiment of the double grill;

Figure 2 is an enlarged fragmentary sectional view taken substantially along a plane as indicated by the line 2—2 of Figure 1;

Figure 3 is a fragmentary edge elevational view of a slightly different form of the grill, and Figure 4 is a fragmentary plan view of a portion thereof.

Referring more specifically to the drawing and first with reference to Figures 1 and 2, the double bacon grill, designated generally 5, as illustrated in these figures includes a bottom plate-like section 6 and a top plate-like section 7, which sections may be formed of any suitable metal constituting a good heat conductor.

The bottom section 6 is provided with spaced substantially parallel upwardly offset portions forming ridges 8 and which provide grooves 9 between said ridges 8. The ridges 8 and grooves 9 are preferably provided with rounded corners or edges 10. The bottom plate 6 is provided with a side edge portion 11 which is substantially flat and a similar opposite side edge portion 12, which portions extend parallel to the ridges 8 and grooves 9. The top plate section 7 corresponds substantially to the bottom plate section 6 and is likewise provided with ridges 13 and grooves 14 disposed therebetween and has side edge portions 15 and 16 disposed parallel to its ridges and grooves. The side edge portion 15 is disposed directly above the side edge portion 11 and said portions are connected intermediate of their ends by a hinge 17 including interfitting barrel portions, constituting either integral parts of the edge portions 11 and 15 or which may be suitably secured thereto, and a hinge pin which extends through the interfitting aligned barrel portions. A pair of handles 18 and 19 are provided having downwardly offset complementary ends 20 and 21, respectively, which are shown secured to the side edge portions 12 and 16 by means of rivets or other suitable fastenings 22. However, said handle portions 20 and 21 may be secured to the edge portions 12 and 16 in any other suitable manner as by means of weldling or may be formed integral therewith.

The grooves 9 of the bottom plate section 6 and the ridges 13 of the top plate section 7 are each provided with a plurality of longitudinally spaced openings or apertures 23 for a purpose which will hereinafter become apparent. As illustrated in Figure 1, the grill 5 is shown provided with sixteen ridges 8 and 13 and sixteen grooves 9 and 14; however, the number of ridges and grooves may be varied.

To use the double grill 5, handle 19 is grasped for swinging the upper plate section 7 upwardly on the hinge 17 and away from the bottom plate section 6. A number of strips of bacon, not shown, are then laid crosswise on the ridges 8 with the ends of each strip of bacon disposed adjacent the side edge portions 11 and 12. The handle 19 is then grasped to swing the top plate section 7 back to its position of Figure 2 and in which position the ridges 8 interfit into the undersides of the ridges 13 and the grooves 14 interfit into the grooves 9, so that each of the strips of bacon is gripped between each of the interfitting ridges 8 and 13 and each of the interfitting grooves 9 and 14. The two handles 18 and 19 are then grasped to position the plates 6 and 7 in a frying pan or skillet, or on a hot plate or flat grill. When thus disposed, it will be readily apparent that the bacon will be cooked uniformly throughout its length as the plates 6 and 7 are sufficiently uniform to transmit a substantially uniform heat to all portions of each strip of the bacon. The grease from the bacon will escape into the grooves 9 and will drain therefrom through the openings 23 of said grooves. The openings 23 of the ridges 13 will allow a certain amount of the pressure of the cooking bacon to escape through the top plate 7. The upwardly offset handles 18 and 19 enable the grill 5 to be placed in a frying pan or skillet having an upwardly extending surrounding wall. After the cooking operation, it will be readily apparent that when the grill 5 is removed from the pan, skillet, grill or hot plate and the top plate 7 is swung upwardly by the handle 19, that the bacon will be ready for removal from the bottom plate 6 and will be in a crisp uniformly cooked condition and of a wavy or undulating configuration from end to end thereof due to its engagement between the ridges and grooves during the cooking operation, so that it will not only be uniformly cooked throughout its length but will be extremely attractive in appearance due to its rippling configuration. Furthermore, it will be readily apparent that the gripping engagement of the ridges and grooves with the strips of bacon will materially minimize the shrinkage of the bacon during the cooking operation.

Obviously, if desired, the handles 18 and 19 may be formed of any suitable heat resistant material. It will also be apparent that the plates 6 and 7 may be made rectangular rather than substantially square as illustrated for accommodating strips of bacon of different lengths and may be elongated in a direction longitudinally of the ridges and grooves for varying the number of strips of bacon which may be accommodated in the grill 5. Likewise, if desired, the plates 6 and 7 may be of circular or oblong shape or any other desired shape to fit a particular skillet, frying pan, grill or hot plate, if desired.

Referring to Figures 3 and 4, a slightly different form of the double grill is illustrated therein and designated generally 25 and which likewise includes a bottom plate section 26 and a top plate section 27 corresponding to the plate sections 6 and 7, respectively, except that the sections 26 and 27 are not provided with side edge portions similar to the side edge portions 12 and 16 but instead are provided with restricted extensions 28 and 29 in lieu thereof and which form the handles of the plate sections 26 and 27, respectively. The handles 28 and 29 are upwardly offset slightly with respect to the bottom surface of the bottom plate 26 and are downwardly offset slightly with respect to the top surface of the top plate 27. In lieu of being formed integral therewith as illustrated in Figures 3 and 4, the handles 28 and 29 could be secured to extensions of the sections 26 and 27, corresponding to the portions 12 and 16, by rivets or other fastenings, corresponding to fastenings 22, or could be welded or otherwise secured thereto. Remote to the handles 28 and 29, the sections 26 and 27 are provided with side edge portions 30 and 31, respectively, corresponding to the portions 11 and 15 and which are connected by a hinge 32, corresponding to the hinge 17.

The grooves or valleys 33 of the bottom section 26 are provided with openings 34, corresponding to the openings 23, and the ridges 35 of the upper plate 27 are similarly provided with apertures 34, as in the grill 5.

The strips of bacon, not shown, are applied to the grill 25 in the same manner as previously described in reference to the grill 5 and are cooked in the same manner except that the grill 25 is capable of being inverted during the cooking operation so that after a part of the cooking has been accomplished with the outer surfaces of grooves 33 resting on the flat grill or hot plate, not shown, the grill 25 is inverted so that the upper plate 27 thereof will then constitute the bottom plate and the grill 25 will then rest upon the outer surfaces of the ridges 35 for thereby more uniformly cooking the bacon on both sides.

While the grills 5 and 25 have been described in connection with the cooking of bacon, for which they are primarily intended, it will be readily apparent that other types of meat or other food in thin slices may be cooked in said grills equally as effectively.

Various modification and changes are contemplated and may obviously be resorted to, without departing from the spirit or scope of the invention as hereinafter defined by the appended claims.

I claim as my invention:

1. A double grill comprising a top plate and a bottom plate each provided with a plurality of spaced substantially parallel upwardly offset portions forming parallel ridges and grooves disposed in interfitting relationship to one another when the top plate is disposed upon the bottom plate and substantially parallel thereto, the grooves of said bottom plate being provided with spaced drainage apertures and the ridges of said top plate being provided with spaced ventilating apertures, said ridges and grooves extending from side to side of the plates and a hinge connecting said top and bottom plates along corresponding edges thereof, said hinge being disposed parallel to said ridges and grooves and connecting the plates whereby the plates are spaced slightly from one another when disposed in parallel relationship to provide an uninterrupted food item receiving space between the adjacent surfaces of the ridges and grooves of the top and bottom plates.

2. A double grill comprising a top plate and a bottom plate each provided with a plurality of spaced substantially parallel upwardly offset portions forming parallel ridges and grooves disposed in interfitting relationship to one another when the top plate is disposed upon the bottom plate and substantially parallel thereto, the grooves of said bottom plate being provided with spaced drainage apertures and the ridges of said top plate being provided with spaced ventilating apertures, said ridges and grooves extending from side to side of the plates, each ridge and groove defining a relatively wide substantially flat surface, each plate having wall portions extending between and connecting the ridges and grooves, and said wall portions being disposed at obtuse angles to top portions of the ridges and to bed portions of said grooves.

WILLIAM F. CRALLE.

References Cited in the file of this patent

UNITED STATES PATENTS

| Number | Name | Date |
|---|---|---|
| 255,380 | Dodson | Mar. 21, 1882 |
| 268,736 | Shaw | Dec. 5, 1882 |
| 565,107 | Devoy | Aug. 4, 1896 |
| 806,475 | Koneman | Dec. 5, 1905 |
| 1,591,207 | Berthelsen | July 6, 1926 |
| 2,198,647 | Wolcott | Apr. 30, 1940 |

FOREIGN PATENTS

| Number | Country | Date |
|---|---|---|
| 303,043 | Great Britain | Dec. 27, 1928 |
| 364,820 | Great Britain | Jan. 14, 1932 |